(12) United States Patent
Baptist et al.

(10) Patent No.: US 10,558,621 B2
(45) Date of Patent: *Feb. 11, 2020

(54) LOCK STEALING WRITES FOR IMPROVED RELIABILITY

(71) Applicant: International Business Machines Corporation, Armonk, NY (US)

(72) Inventors: Andrew D. Baptist, Mt. Pleasant, WI (US); Greg R. Dhuse, Chicago, IL (US); Ilya Volvovski, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 15/432,751

(22) Filed: Feb. 14, 2017

(65) Prior Publication Data
US 2017/0160941 A1 Jun. 8, 2017

Related U.S. Application Data

(63) Continuation-in-part of application No. 14/055,174, filed on Oct. 16, 2013, now Pat. No. 9,811,533.
(Continued)

(51) Int. Cl.
*G06F 16/176* (2019.01)
*G06F 16/182* (2019.01)

(52) U.S. Cl.
CPC ........ *G06F 16/182* (2019.01); *G06F 16/1774* (2019.01)

(58) Field of Classification Search
CPC .. G06F 16/182; G06F 16/1774; G06F 3/0604; G06F 3/067; G06F 3/0637
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — James Trujillo
*Assistant Examiner* — Jessica N Le
(74) *Attorney, Agent, or Firm* — Garlick & Markison; Timothy W. Markison; Patricia A. Markison

(57) ABSTRACT

A method includes sending, by a first computing device, a first set of write requests and sending, by a second computing device, a second set of write requests to a set of storage units. The method further includes receiving, by the first computing device, favorable write responses from a first subset of storage units of the set of storage units and receiving, by the second computing device, favorable write responses from a second subset of storage units. The method further includes determining, by the first computing device, whether a number of the favorable write responses from the first subset of storage units equals or exceeds a write threshold number. When the number of the favorable write responses from the first subset of storage units equals or exceeds the write threshold number, the first computing device sends a set of commit requests to the set of storage units.

18 Claims, 8 Drawing Sheets

Related U.S. Application Data

(60) Provisional application No. 61/733,686, filed on Dec. 5, 2012.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,962,641 B1 | 6/2011 | Dhuse et al. | |
| 8,479,046 B1 | 7/2013 | Bailey et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1* | 5/2003 | Shu | G06F 11/1076 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1* | 4/2009 | Gladwin | H04L 67/1097 709/203 |
| 2010/0023524 A1* | 1/2010 | Gladwin | G06F 3/0617 707/E17.032 |
| 2010/0169391 A1 | 7/2010 | Baptist et al. | |
| 2011/0029731 A1* | 2/2011 | Cilfone | G06F 11/1076 711/114 |
| 2011/0055277 A1 | 3/2011 | Resch | |
| 2011/0072321 A1* | 3/2011 | Dhuse | G06F 11/1076 714/55 |
| 2011/0078373 A1* | 3/2011 | Hoffman | G06F 11/10 711/114 |
| 2011/0161754 A1* | 6/2011 | Baptist | G06F 11/1092 714/718 |
| 2011/0184997 A1 | 7/2011 | Grube et al. | |
| 2011/0264717 A1 | 10/2011 | Grube et al. | |
| 2011/0289122 A1 | 11/2011 | Grube et al. | |
| 2013/0151558 A1 | 6/2013 | Chercoles S Nchez et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

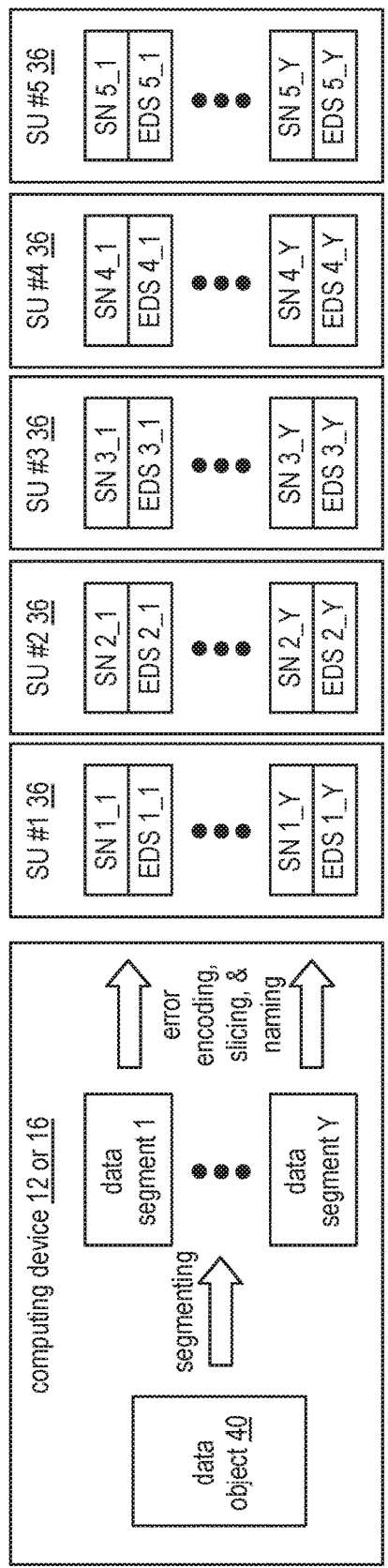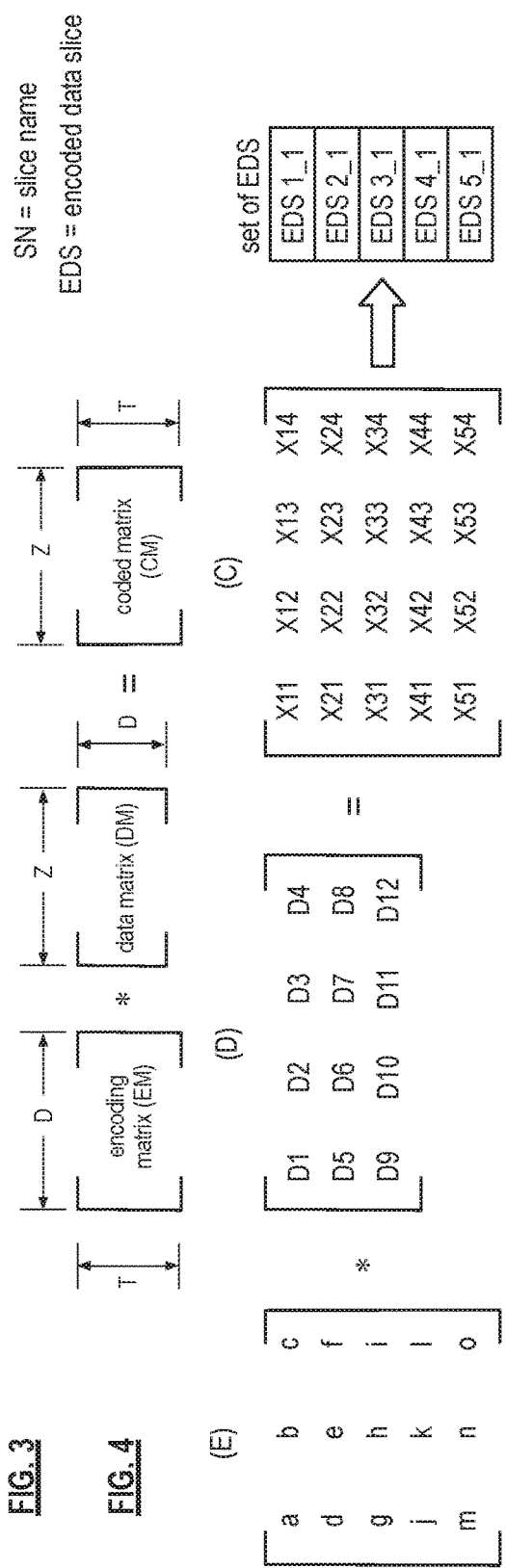

LOCK STEALING WRITES FOR IMPROVED RELIABILITY

CROSS-REFERENCE TO RELATED APPLICATIONS

The present U.S. Utility Patent Application claims priority pursuant to 35 U. S.C. § 120 as a continuation-in-part of U.S. Utility application Ser. No. 14/055,174, entitled "ACCESSING DISTRIBUTED COMPUTING FUNCTIONS IN A DISTRIBUTED COMPUTING SYSTEM," filed Oct. 16, 2013, which claims priority pursuant to 35 U.S.C. § 119(e) to U.S. Provisional Application No. 61/733,686, entitled "GENERATING A DISPERSED QUEUE," filed Dec. 5, 2012, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage. More than one client may require access to the same data stored in a dispersed storage system creating race condition concerns.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
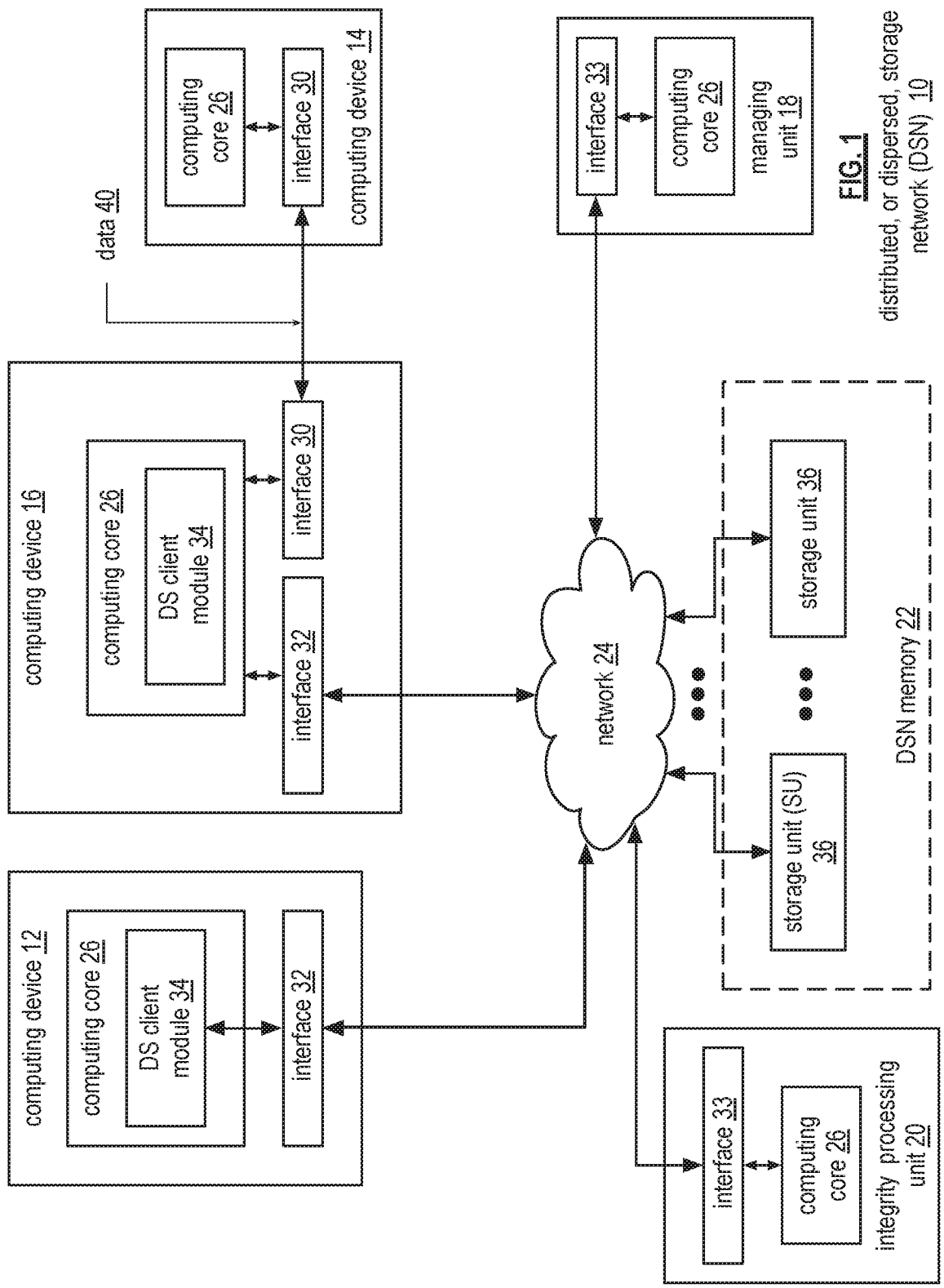
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
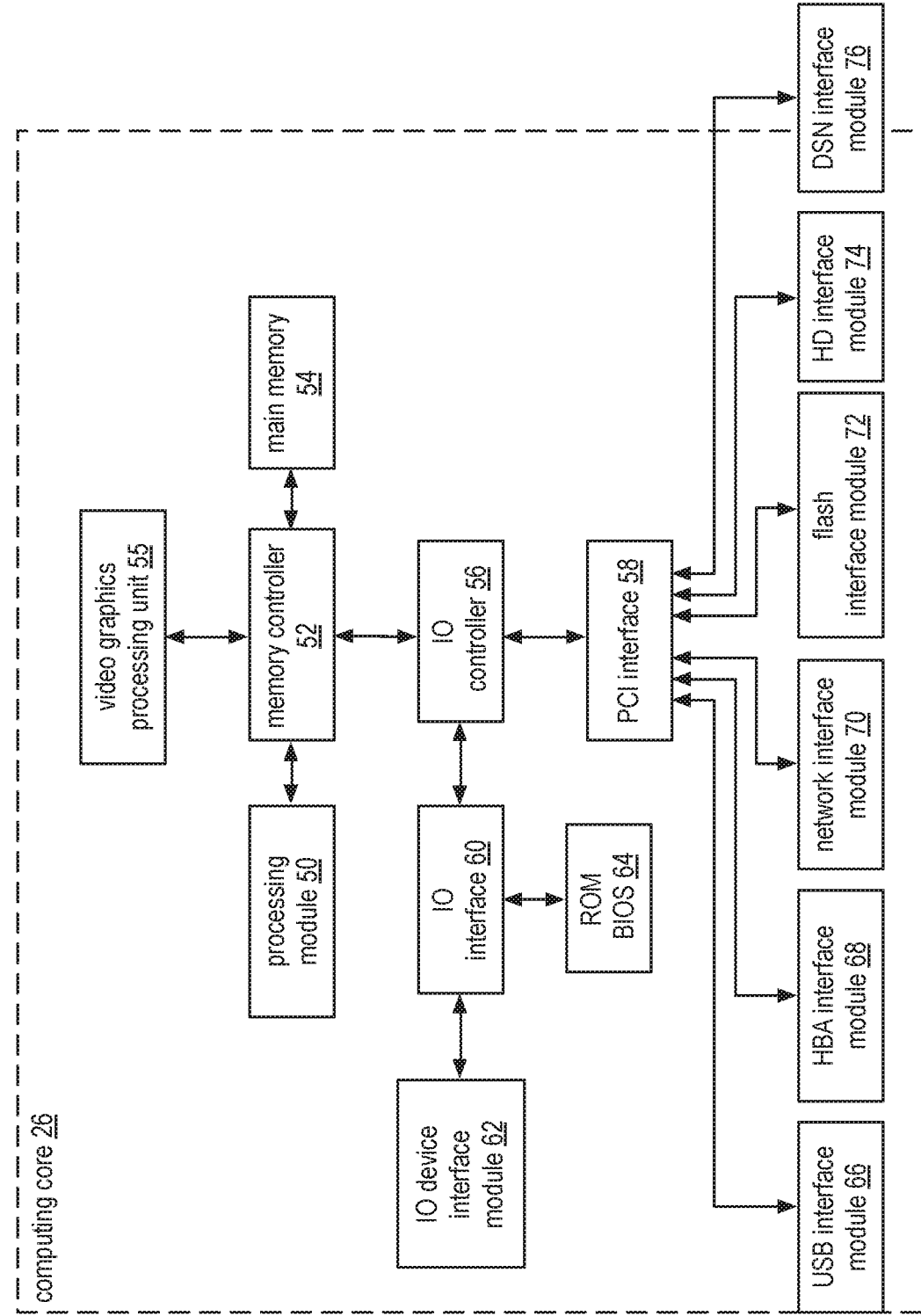
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
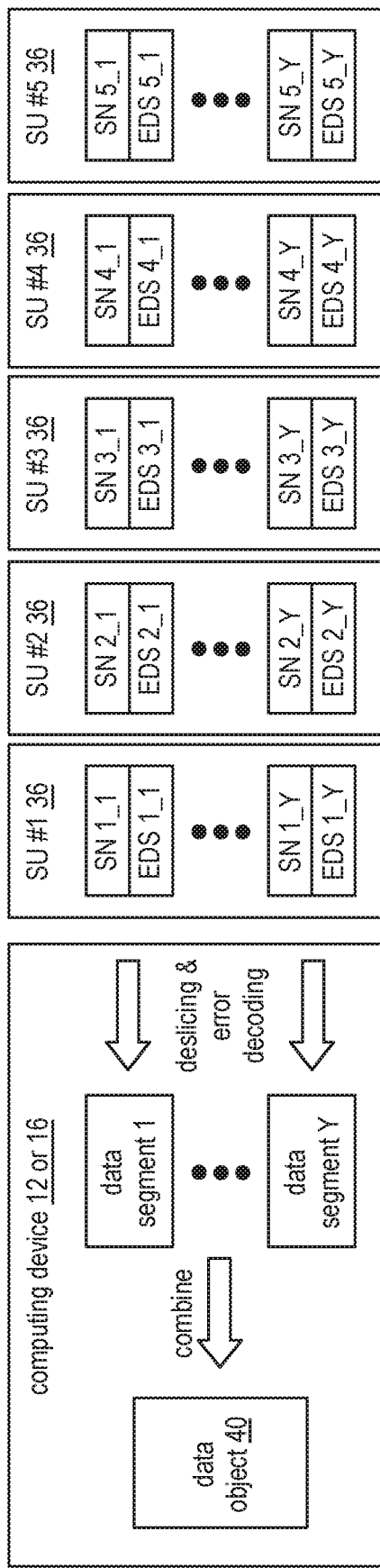
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
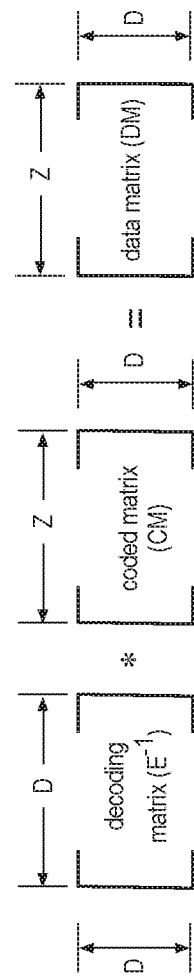
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
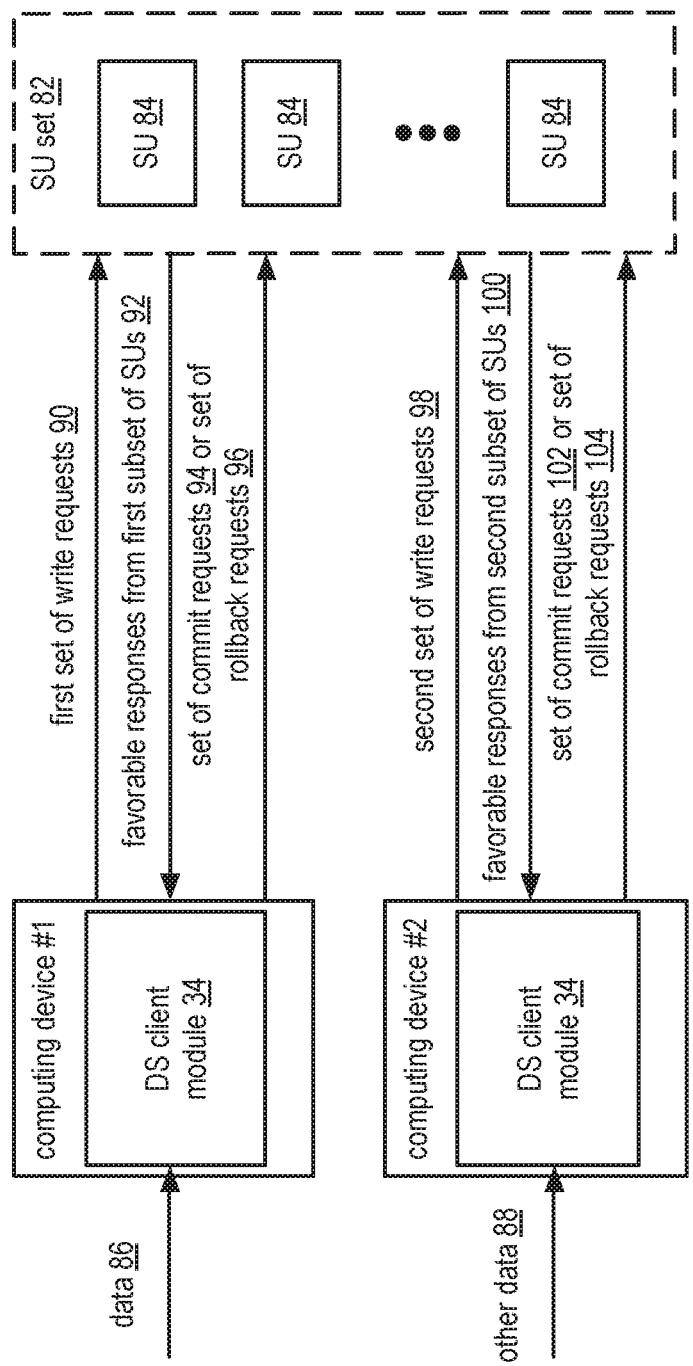
FIG. 9 is a schematic block diagram of an embodiment of a dispersed storage network in accordance with the present invention.

FIG. 9 is a schematic block diagram of an embodiment of a dispersed storage network (DSN) that includes two or more computing devices, and a set of storage units (SUs) 82. The two or more computing devices (e.g., computing device #1 and computing device #2) each include distributed storage (DS) client modules 34. Computing device #1 and computing device #2 may be computing devices 12 or 16 of FIG. 1. The set of storage units 82 includes a plurality of storage units 84. A storage unit 84 of the set of storage units 82 may be implemented utilizing one or more of a storage server, a storage module, a memory device, and the storage unit 36 of FIG. 1. Each DS client module 34 may alternatively be implemented utilizing one or more of the processing module, a client device, a user device, and an integrity processing unit (e.g., integrity processing unit 20 of FIG. 1). The set of storage units 82 is shared by the two or more computing devices (of computing device #1 and computing device #2) for storage of one or more sets of encoded data slices. A set of encoded data slices of the one or more sets of encoded data slices may be shared between the two or more computing devices such that the two or more computing devices may substantially access the set of encoded data slices simultaneously (e.g., a race condition).

A race condition during a three phase write operation could potentially delay or stall processing. The three phase write operation includes phases: 1) write, 2) commit, and 3) finalize. In general, the first phase involves sending (e.g., by a computing device) a set of write requests along with a set of encoded data slices to a set of storage units. The second phase involves locking, by the set of storage units, the write operations associated with write requests of the set of write requests (i.e., committing), temporarily storing the corresponding encoded data slices, and sending a set of commit responses. The final stage involves determining whether a write threshold number of commit responses have been received by the computing device in order to complete the write. When a race condition occurs, the timing of the first two phases will determine which competing device will "win" the particular write operation.

In an example of operation, the DS client module 34 of computing device #1 encodes data 86 to produce one or more sets of encoded data slices and generates one or more sets of associated slice names. The one or more sets of encoded data slices include a set of encoded data slices that is shared between computing device #1 and computing device #2. The DS client module 34 of computing device #2 encodes other data 88 to produce another one or more sets of encoded data slices that includes the shared set of encoded data slices and generates the one or more sets of associated slice names (e.g., at least some identical slice names produced by the DS client module 34 of computing device #1). The DS client module 34 of computing device #1 generates a set of write requests that includes the one or more sets of encoded data slices and the one or more sets of associated slice names. A first set of write requests of the set of write requests generated by the DS client module 34 of computing device #1 is regarding the set of encoded data slices shared by computing device #1 and computing device #2 (i.e., the shared set of encoded data slices).

The DS client module 34 of computing device #2 generates another set of write requests that includes the other one or more sets of encoded data slices and generates one or more sets of associated slice names. A second set of write requests of the another set of write requests is regarding the shared set of encoded data slices (i.e., both the first and second sets of write requests are regarding the same set of encoded data slices). In a race condition, the DS client module 34 of computing device #1 outputs the first set of write requests 90 of the set of write requests to the set of storage units 82, and, substantially concurrently, the DS client module 34 of the computing device #2 outputs the second set of write requests 98 of the another set of write requests to the set of storage units 82. Each write request sent includes one or more of a transaction number, a request number, a slice name, a slice revision, a slice length, and an encoded data slice. The DS client modules 34 of computing device #1 and computing device #2 generate the transaction number based on one or more of a random number, a pseudorandom algorithm, a previous transaction number, and a look up. For example, a DS client module 34 of computing device #1 generates a transaction number as a random number.

The set of storage units 82 receives the first set of write requests 90 and the second set of write requests 98. The set of storage units 82 processes the write requests by temporarily storing the encoded data slices and determining whether storage errors exist. In response to processing the first and second set of write requests, the set of storage units 82 generates and sends favorable or unfavorable write responses to computing device #1 and computing device #2. The favorable or unfavorable responses include one or more of the transaction number, the request number, and the status code with regards to the determining whether the storage error exists. The status code includes at least one of a succeeded indicator, a locked by another transaction error indicator, an address error indicator, a checked write condition error indicator, and an unauthorized error indicator. For example, a favorable write response may include a status code that indicates the write has succeeded while an unfavorable response may include a status indicator that the write is locked by another transaction (e.g., a locked write operation).

When a storage unit 84 of the set of storage units 82 receives a write request of the first set of write requests 90 prior to receiving a write request of the second set of write requests 98, the storage unit 84 locks the write operation for the write request of the first set of write requests. The storage unit 84 will then send a favorable response to computing device #1, and send an unfavorable response to computing device #2. Alternatively, when a storage unit 84 receives a write request of the second set of write requests 98 prior to receiving a write request of the first set of write requests 90, the storage unit 84 will lock a write operation for the write request of the second set of write requests. The storage unit 84 will then send a favorable response to computing device #2 and an unfavorable response to computing device #1. Thus, computing device #1 will receive favorable write responses from a first subset of storage units 92 of the set of storage units 82 and computing device #2 will receive favorable write responses from a second subset of storage units 100 of the set of storage units.

When the DS client module 34 of computing device #1 receives a number of favorable write responses from the first subset of storage units that equals or exceeds a write threshold number, the DS client module 34 of computing device #1 generates a set of commit requests 94. The write threshold number is a number greater than the decode threshold number and less than the pillar number and is determined based on statistical factors such as the storage unit reliability and usage. Each commit request of the set of commit requests includes one or more of a corresponding transaction number (e.g., the transaction number for the DS client module 34 of computing device #1), and another request number. The DS client module 34 of computing device #1 outputs the set of commit requests 94 to the set of storage units 82. When a storage unit 84 receives a commit request of the set of commit requests 94, the storage unit 84 identifies a corresponding slice name based on the corresponding transaction number. The storage unit 84 performs a commit function on the identified slice name.

The commit function includes at least one of facilitating storage of a temporarily storing a slice that corresponds to the slice name (e.g., going from temporary storage to long-term storage) and indicating that the write operation is locked. The storage unit 84 may then generate a commit response where the commit response includes one or more of the another request number, a commit status indicator, and the corresponding transaction number. The commit status indicator indicates an error condition or a non-error condition with regards to performing the commit function. The storage unit 84 then sends the commit response to computing device #1. Computing device #1 then determines whether it has received a write threshold number of favorable commit responses from the set of storage units. When a write threshold number of favorable commit responses from the set of storage units has been received, computing device #1 will send a set of finalize requests to the set of storage units. The outputting includes generating the set of finalize requests to include the transaction number associated with the set of write requests. When a write threshold number of favorable commit responses from the set of storage units has not been received, computing device #1 will send a set of undo requests to the set of storage units to cancel the write operation.

Alternatively, when the DS client module 34 of computing device #1 receives a number of favorable responses from the first subset of storage units that is less than the write threshold number, the DS client module 34 of computing device #1 generates a set of rollback requests 96. A rollback request of the set of rollback requests alerts a storage unit 84 that the write request can be disregarded and therefore the write operation and corresponding encoded data slice can be deleted. The DS client module 34 of computing device #1 outputs the set of rollback requests 96 to the storage unit set 82 where each rollback request includes one or more of a corresponding transaction number (e.g., the transaction number for the DS client module 34 of computing device #1). The set of storage units 82 then return rollback responses to inform computing device #1 of rollback execution (e.g., rollback execution notification).

Likewise, when the DS client module 34 of computing device #2 receives a number of favorable write responses from the second subset of storage units that equals or exceeds a write threshold number, the DS client module 34 of computing device #2 generates a set of commit requests 102 where each commit request includes one or more of a corresponding transaction number (e.g., the transaction number for the DS client module 34 of computing device #2), and another request number. DS client module 34 of computing device #2 outputs the set of commit requests 102 to the storage unit set 82. The storage unit 84 may then generate a commit response where the commit response includes one or more of the another request number, a commit status indicator, and the corresponding transaction number. The commit status indicator indicates an error condition or a non-error condition with regards to performing the commit function. The storage unit 84 then sends the commit response to the computing device #2. If a write threshold number of commit responses are received, computing device #2 will send a set of finalize requests to the set of storage units. If a write threshold number of commit responses are not received, computing device #2 will send a set of undo requests to the set of storage units 82 to cancel the write operation.

Alternatively, when the DS client module 34 of computing device #2 receives a number of favorable responses from the second subset of storage units that is less than the write threshold number, the DS client module 34 of computing device #2 generates a set of rollback requests 104. The DS client module 34 of computing device #1 outputs the set of rollback requests 104 to the storage unit set 82 where each rollback request includes one or more of a corresponding transaction number (e.g., the transaction number for the DS client module 34 of computing device #2). The set of storage units then return rollback responses to inform computing device #2 of rollback execution (e.g., rollback execution notification).

As discussed previously, when a storage unit 84 of the set of storage units 82 receives a write request sent from one computing device prior to receiving a write request sent from the other computing device, the storage unit 82 will send a favorable response to computing device that sent the write request first (i.e., the "winner" of the race). However, if that "winning" computing device does not receive at least a write threshold number of favorable responses from the set of storage units, that computing device will send a set of rollback requests to the set of storage units. During the race condition, there may be a situation where the storage unit has locked a write operation for the computing device that won that particular storage unit but receives a commit request from another computing device prior to receiving a rollback request from the computing device that has the locked write operation. In such a situation, the storage unit may force a rollback of the initial write request or wait a period of time to receive the rollback request.

As a specific example, if a storage unit 84 of the set of storage units 82 receives a write request of the first set of write requests 90 prior to receiving a write request of the second set of write requests 98, the storage unit 84 will lock a write operation for the write request of the first set of write requests 90 and send a favorable response to computing device #1. If the storage unit 84 then receives a commit request of a set of commit request 102 from the computing device #2, the storage unit 84 will unlock the write operation for the write request of the first set of write requests 90, and lock the write operation for the write request of the second set of write requests 98. The storage unit 84 will then commit the write operation for the write request of the second set of write requests 98, and delete the write operation for the write request of the first set of write requests 90. The storage unit will then notify computing device #1 that the write operation for the write request of the first set of write requests 90 has been rolled back (e.g., send a rollback execution notification). Alternatively, the storage unit 84 may wait a predetermined amount of time to receive a rollback request of a set of rollback requests 96 from computing device #1 before forcing a rollback of the write request of the first set of write requests 90. If the rollback request is received within the predetermined amount of time, the storage unit will execute the rollback request. If the rollback request is not received within the predetermined amount of time the storage unit will complete the forced rollback as discussed previously.

During the race condition, there may also be a situation where a storage unit 84 of the set of storage units 82 has locked a write operation for a computing device but receives a rollback request from that computing device prior to receiving a commit request from the other competing computing device. If the rollback request is executed prior to receiving the commit request from the other competing computing device, there is a risk that the storage unit may execute a write request for a third entity not involved in the race and complicate the other competing computing device's write operation. In this situation, the storage unit will wait a period of time to receive the other competing computing device's commit request before completing the rollback request.

As a specific example, when a storage unit 84 of the set of storage units 82 has a locked write operation for a write request of the first set of write requests 90 and receives a rollback request of a set of rollback requests 96 from computing device #1 prior to receiving a commit request of a set of commit requests 102 from computing device #2, the storage unit will wait a predetermined amount of time to receive a commit request of the set of commit requests 102 from computing device #2 before executing the rollback request of the set of rollback requests 96 from computing device #1. When the commit request of the set of commit requests 102 from computing device #2 is received within the predetermined amount of time or when the commit request of the set of commit requests 102 from computing device #2 is not received within the predetermined amount of time, the storage unit 84 will execute the rollback request of the set of rollback requests 96 from computing device #1.

Another issue that may occur during the race condition is that neither computing device may receive a write threshold number of favorable responses from the set of storage units, and neither computing device will "win" the race. For example, computing device #1 may receive a number of favorable write responses from the first subset of storage units that is less than the write threshold number, and computing device #2 may also receive a number of favorable write responses from the second subset of storage units that is less than the write threshold number. In this example, both computing device #1 and #2 will send a set of rollback requests to the set of storage units creating a stall. Instead of rolling back all write operations, the set of storage units 82 will select a winner based on a contention resolution policy. The contention resolution policy instructs the set of storage units as to the priority of computing devices based on user identification information. For example, the contention resolution policy may dictate that an original author has priority over other users. As another example, the contention resolution policy may dictate that a lead editor may have priority over another user.

After the set of storage units 82 selects a winner based on the contention resolution policy, the set of storage units 82 will unlock write operations locked by the computing device that was not selected. The set of storage units 82 will then lock at least a write threshold number of write operations for the selected computing device and send requests to the selected computing device for the selected computing device to send commit requests. The set of storage units will also execute the set of rollback requests from the computing device that was not selected, and notify the computing device that was not selected that the rollback requests were executed.

Figure 10:
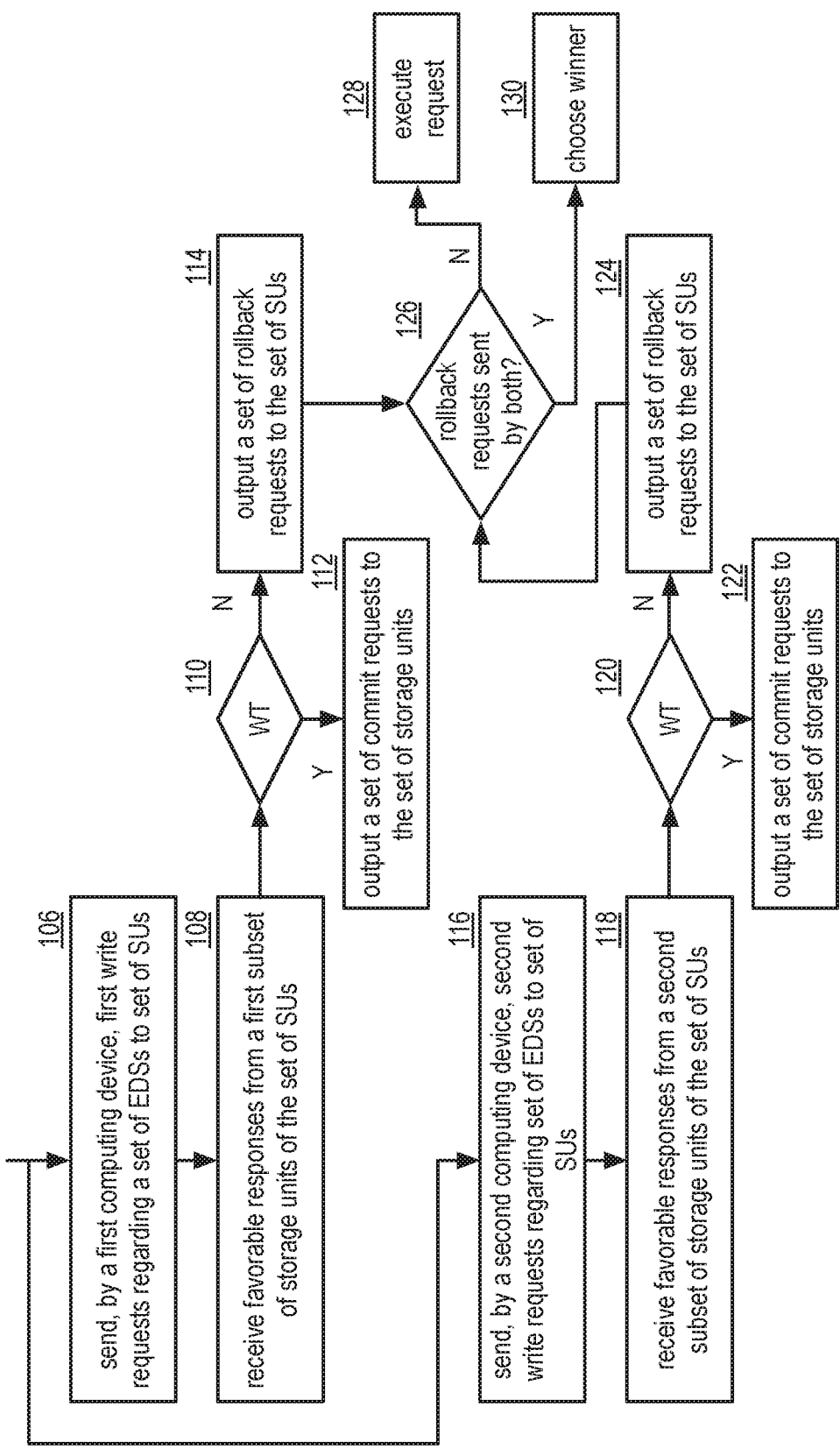
FIG. 10 is a logic diagram of an example of storing data in accordance with the present invention.

FIG. 10 is a logic diagram illustrating an example of storing data. During the race condition previously discussed with reference to FIG. 9, steps 106-114 and steps 116-124 occur substantially concurrently. The method begins at steps 106 and 116. At step 106, a first computing device sends a first set of write requests regarding a set of encoded data slices to a set of storage units. At step 116, a second computing device sends a second set of write requests regarding the set of encoded data slices to the set of storage units substantially concurrently with the first computing device sending the first set of write requests. Each write request sent includes one or more of a transaction number, a request number, a slice name, a slice revision, a slice length, and an encoded data slice.

The method continues at steps 108 and 118. At step 108, the first computing device receives favorable write responses from a first subset of storage units of the set of storage units. At step 118, the second computing device receives favorable write responses from a second subset of storage units of the set of storage units. For example, when the set of storage units receives the first set of write requests and the second set of write requests, the set of storage units processes the write requests by temporarily storing the encoded data slices and determining whether storage errors exist. In response to processing the first and second set of write requests, the set of storage units generates and sends favorable or unfavorable write responses to the first computing device and the second computing device. The favorable or unfavorable responses include one or more of the transaction number, the request number, and the status code with regards to the determining whether the storage error exists. The status code includes at least one of a succeeded indicator, a locked by another transaction error indicator, an address error indicator, a checked write condition error indicator, and an unauthorized error indicator. A favorable write response may include a status code that indicates the write has succeeded while an unfavorable response may include a status indicator that the write is locked by another transaction (e.g., a locked write operation).

For example, when a storage unit of the set of storage units receives a write request of the first set of write requests prior to receiving a write request of the second set of write requests, the storage unit locks the write operation for the write request of the first set of write requests. The storage unit will then send a favorable response to the first computing device, and send an unfavorable response to the second computing device. Alternatively, when a storage unit receives a write request of the second set of write requests prior to receiving a write request of the first set of write requests, the storage unit will lock a write operation for the write request of the second set of write requests. The storage unit will then send a favorable response to the second computing device and an unfavorable response to the first computing device.

The method continues with steps 110 and 120. At step 110, the first computing device determines whether the number of favorable write responses received from the first subset of storage units equals or exceeds a write threshold number. The write threshold number is a number greater than the decode threshold number and less than the pillar number and is determined based on statistical factors such as the storage unit reliability and usage. At step 120, the second computing device determines whether the number of favorable write responses received from the second subset of storage units received equals or exceeds the write threshold number.

When the first computing device determines that the number of favorable write responses received from the first subset of storage units equals or exceeds the write threshold number in step 110, the method continues to step 112 where the first computing device generates and outputs a set of commit requests to the set of storage units. Each commit request of the set of commit requests includes one or more of a corresponding transaction number (e.g., the transaction number for the first computing device), and another request number. When a storage unit of the set of storage units receives a commit request of the set of commit requests, the storage unit identifies a corresponding slice name based on the corresponding transaction number. The storage unit performs a commit function on the identified slice name. The commit function includes at least one of facilitating storage of a temporarily storing a slice that corresponds to the slice name (e.g., going from temporary storage to long-term storage) and indicating that the write operation is locked.

When the first computing device determines that the number of favorable write responses received from the first subset of storage units does not equal or exceeds the write threshold number at step 110, the method continues to step 114 where the first computing device generates and outputs a set of rollback requests to the set of storage units. A rollback request of the set of rollback requests alerts a storage unit that the write request can be disregarded and therefore the write operation and corresponding encoded data slice can be deleted. Each rollback request includes one or more of a corresponding transaction number (e.g., the transaction number for the first computing device). The set of storage units then return rollback responses to inform the first computing device of rollback execution (e.g., rollback execution notification).

When the second computing device determines that the number of favorable write responses received from the second subset of storage units equals or exceeds the write threshold number in step 120, the method continues to step 122 where the second computing device generates and outputs a set of commit requests to the set of storage units. Each commit request of the set of commit requests includes one or more of a corresponding transaction number (e.g., the transaction number for the second computing device), and another request number. When a storage unit of the set of storage units receives a commit request of the set of commit requests, the storage unit identifies a corresponding slice name based on the corresponding transaction number. The storage unit performs a commit function on the identified slice name. The commit function includes at least one of facilitating storage of a temporarily storing a slice that corresponds to the slice name (e.g., going from temporary storage to long-term storage) and indicating that the write operation is locked.

When the second computing device determines that the number of favorable write responses received from the second subset of storage units does not equal or exceeds the write threshold number in step 120, the method continues to step 124 where the second computing device generates and outputs a set of rollback requests to the set of storage units. A rollback request of the set of rollback requests alerts a storage unit that the write request can be disregarded and therefore the write operation and corresponding encoded data slice can be deleted. Each rollback request includes one or more of a corresponding transaction number (e.g., the transaction number for the second computing device). The set of storage units then return rollback responses to inform the second computing device of rollback execution (e.g., rollback execution notification).

If the first or second computing device outputs a set of rollback requests at steps 114 and/or 124, the method continues to step 126 where the set of storage units determine whether it has received a set of rollback requests from both the first and second computing devices. If neither computing device receives a write threshold number of favorable responses from the set of storage units, neither computing device will "win" the race for the competing write operation. For example, the first computing device may receive a number of favorable write responses from the first subset of storage units that is less than the write threshold number, and the second computing device may also receive a number of favorable write responses from the second subset of storage units that is less than the write threshold number causing both devices to send a set of rollback requests to the set of storage units.

When both the first computing device and the second computing device send a set of rollback requests to the set of storage units, the method continues to step 130, where the set of storage units will select a winner based on a contention resolution policy. The contention resolution policy instructs the set of storage units as to the priority of computing devices based on user identification information. For example, the contention resolution policy may dictate that an original author has priority over other users. As another example, the contention resolution policy may dictate that a lead editor may have priority over another user. After the set of storage units selects a winner based on the contention resolution policy, the set of storage units will unlock write operations locked by the computing device that was not selected. The set of storage units will then lock at least a write threshold number of write operations for the selected computing device and send requests to the selected computing device for the selected computing device to send commit requests. The set of storage units will also execute the set of rollback requests from the computing device that was not selected, and notify the computing device that was not selected that the rollback requests were executed. If a set of rollback requests were not sent by both the first and second computing devices, the method continues with step 128 where the set of storage units execute the rollback requests.

Figure 11:
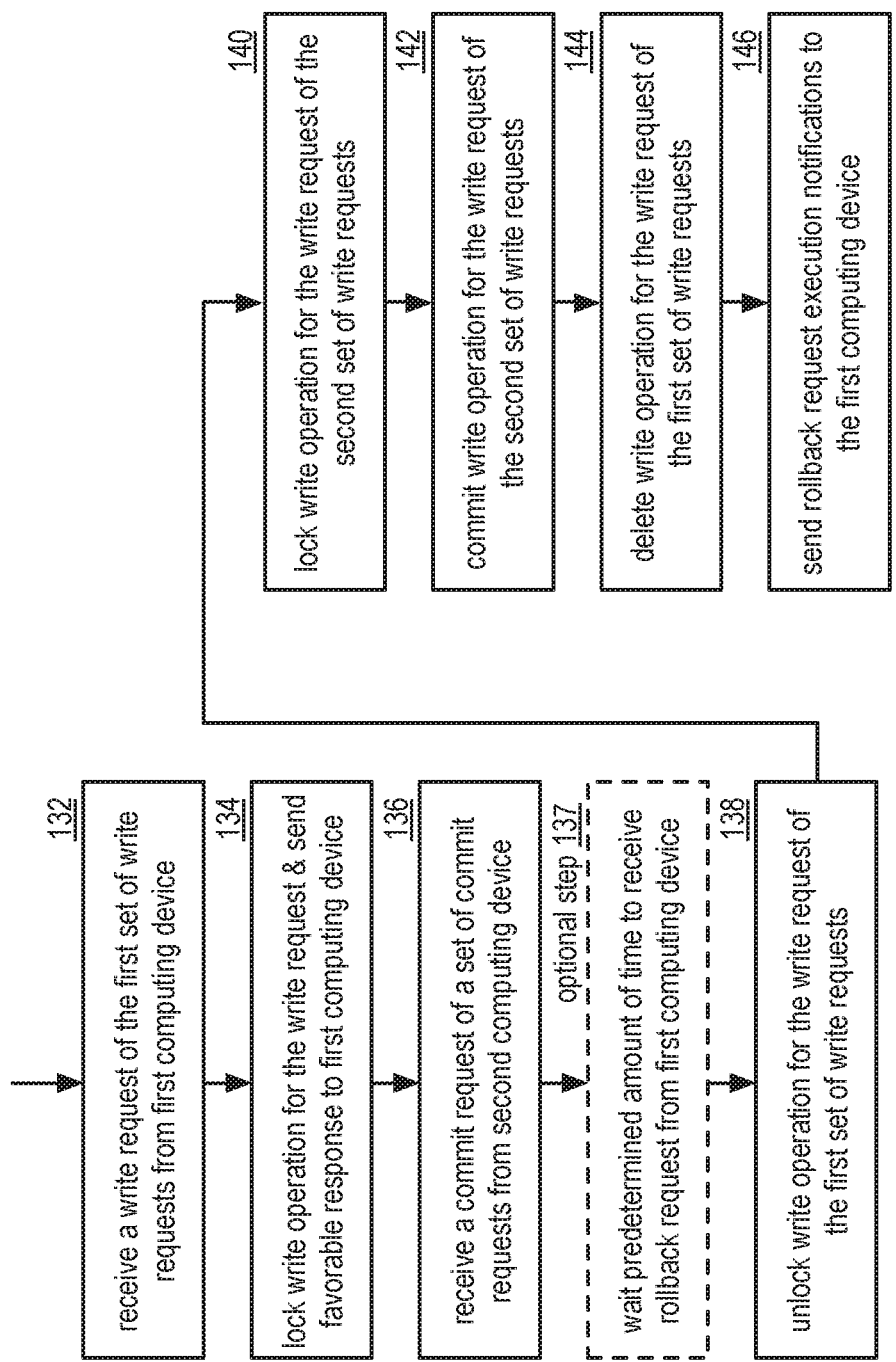
FIG. 11 is a logic diagram of another example of storing data in accordance with the present invention.

FIG. 11 is a logic diagram illustrating another example of storing data. The method begins with step 132 where a storage unit of a set of storage units receives a write request of the first set of write requests from a first computing device. The method continues with step 134 where the storage unit locks the lock operation for the write request of the first set of write requests and sends a favorable response to the first computing device. The method continues with step 136 where the storage unit receives a commit request of a set of commit request from a second computing device during the race condition previously discussed with reference to FIG. 9. The method may then continue with optional step 137 where the storage unit waits a predetermined amount of time to receive a rollback request of a set of rollback requests from the first computing device. If the rollback request is received within the predetermined amount of time or if the rollback request is not received within the predetermined amount of time the storage unit will continue to step 138. After step 136 or optional step 137, the method continues with step 138 where the storage unit unlocks the write operation for the write request of the first set of write requests.

The method continues with step 140 where the storage unit locks the write operation for the write request of the second set of write requests. The method continues with step 142 where the storage unit commits the write operation for the write request of the second set of write request. The method continues with step 144 where the storage unit deletes the write operation for the write request of the first set of write requests. The method continues with step 146 where the storage unit sends a rollback request execution notification to the first computing device.

Figure 12:
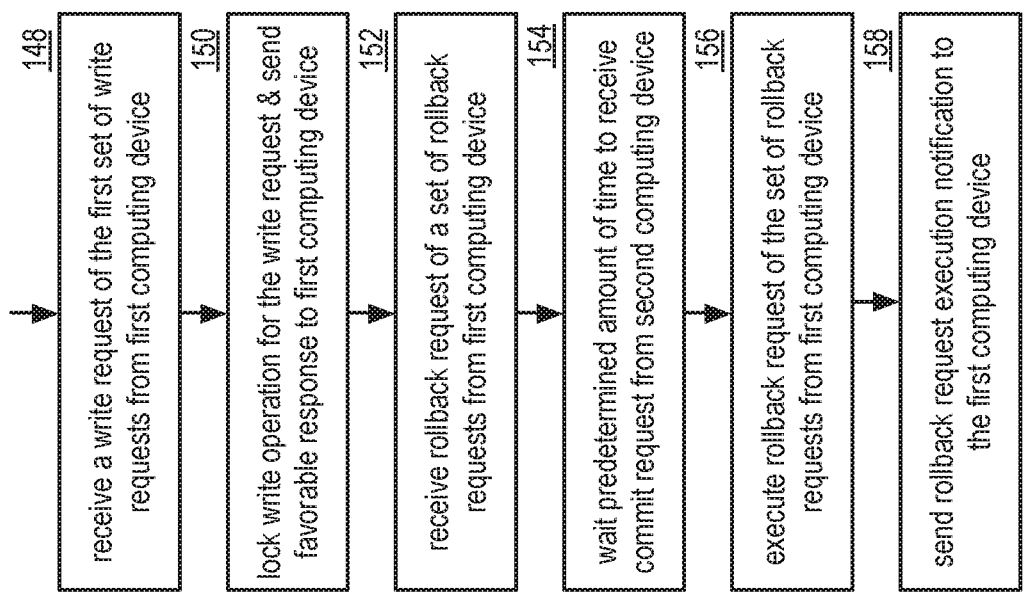
FIG. 12 is a logic diagram of another example of storing data in accordance with the present invention.

FIG. 12 is a logic diagram illustrating another example of storing data. The method begins with step 148 where a storage unit of a set of storage units receives a write request of the first set of write requests from a first computing device. The method continues with step 150 where the storage unit locks the lock operation for the write request of the first set of write requests and sends a favorable response to the first computing device. The method continues with step 152 where the storage unit receives a rollback request of a set of rollback requests from the first computing device. During a race condition as discussed with reference to FIG. 9, executing a rollback request prior to receiving a commit request from the other competing computing device, creates a risk that the storage unit may execute a write request for a third entity not involved in the race and complicate the other competing computing device's write operation. To help prevent this situation, the storage unit will wait a period of time to receive the other competing computing device's commit request before completing the rollback request.

The method therefore continues with step 154 where the storage unit waits a predetermined amount of time to receive a commit request of a set of commit requests from a second computing device. If the commit request is received within the predetermined amount of time or if the commit request is not received within the predetermined amount of time the storage unit will continue to step 156 where the storage unit executes the rollback request of the set of rollback requests from the first computing device. The method continues with step 158 where the storage unit sends a rollback request execution notification to the first computing device.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
sending, by a first computing device of a dispersed storage network (DSN), a first set of write requests to a set of storage units of the DSN, wherein the first set of write requests is regarding a set of encoded data slices;
sending, by a second computing device of the DSN, a second set of write requests to the set of storage units, wherein the second set of write requests is regarding the set of encoded data slices, wherein the second computing device sends the second set of write requests substantially concurrently with the first computing device sending the first set of write requests;
receiving, by the first computing device, favorable write responses from a first subset of storage units of the set of storage units;
receiving, by the second computing device, favorable write responses from a second subset of storage units of the set of storage units;
determining, by the first computing device, whether a number of the favorable write responses from the first subset of storage units equals or exceeds a write threshold number;
when the number of the favorable write responses from the first subset of storage units equals or exceeds the write threshold number, sending, by the first computing device, a set of commit requests to the set of storage units; and
when a storage unit of the set of storage units has a locked write operation for a write request of the first set of write requests and receives a commit request of a set of commit requests from the second computing device prior to receiving a rollback request of a set of rollback requests from the first computing device:
implementing, by the storage unit, a forced rollback of the locked write operation.

2. The method of claim 1 further comprises:
when the number of the favorable write responses from the first subset of storage units is less than the write threshold number, sending, by the first computing device, a set of rollback requests to the set of storage units.

3. The method of claim 1 further comprises:
determining, by the second computing device, whether a number of the favorable write responses from the second subset of storage units equals or exceeds the write threshold number; and
when the number of the favorable write responses from the second subset of storage units equals or exceeds the write threshold number, sending, by the second computing device, a set of commit requests to the set of storage units.

4. The method of claim 1 further comprises:
determining, by the second computing device, whether a number of the favorable write responses from the second subset of storage units equals or exceeds the write threshold number; and
when the number of the favorable write responses from the second subset of storage units is less than the write threshold number, sending, by the second computing device, a set of rollback requests to the set of storage units.

5. The method of claim 1 further comprises:
when a storage unit of the set of storage units receives a write request of the first set of write requests prior to receiving a write request of the second set of write requests:
- locking, by the storage unit, a write operation for the write request of the first set of write requests;
- sending, by the storage unit, a favorable response to the first computing device; and
- sending, by the storage unit, an unfavorable response to the second computing device.

6. The method of claim 1, wherein the implementing the forced rollback of the locked write operation includes:
- unlocking, by the storage unit, the write operation for the write request of the first set of write requests;
- locking, by the storage unit, a write operation for a write request of the second set of write requests;
- committing, by the storage unit, the write operation for the write request of the second set of write requests;
- deleting, by the storage unit, the write operation for the write request of the first set of write requests; and
- sending, by the storage unit, a rollback execution notification to the first computing device.

7. The method of claim 1, wherein the implementing the forced rollback of the locked write operation includes:
- waiting, by the storage unit, a predetermined amount of time to receive a rollback request of the set of rollback requests from the first computing device; and
- when the rollback request is received from the first computing device within the predetermined amount of time or when the rollback request is not received from the first computing device within the predetermined amount of time:
  - unlocking, by the storage unit, the write operation for the write request of the first set of write requests;
  - locking, by the storage unit, the write operation for the write request of the second set of write requests;
  - committing, by the storage unit, the write operation for the write request of the second set of write requests;
  - deleting, by the storage unit, the write operation for the write request of the first set of write requests; and
  - sending, by the storage unit, a rollback execution notification to the first computing device.

8. The method of claim 1 further comprises:
when a storage unit of the set of storage units has a locked write operation for a write request of the first set of write requests and receives a rollback request of a set of rollback requests from the first computing device prior to receiving a commit request of a set of commit requests from the second computing device:
- waiting, by the storage unit, a predetermined amount of time to receive a commit request of the set of commit requests from the second computing device before executing the rollback request of the set of rollback requests from the first computing device; and
- when the commit request of the set of commit requests from the second computing device is received within the predetermined amount of time or when the commit request of the set of commit requests from the second computing device is not received within the predetermined amount of time:
  - executing, by the storage unit, the rollback request of the set of rollback requests from the first computing device.

9. The method of claim 1 further comprises:
- receiving, by the set of storage units, a set of rollback requests from the first computing device and a set of rollback requests from the second computing device;
- selecting, by the set of storage units, one of the first computing device and the second computing device as a selected computing device based on a contention resolution policy;
- unlocking, by the set of storage units, write operations locked by the unselected computing device;
- locking, by the set of storage units, at least a write threshold number of write operations for the selected computing device;
- sending, by the set of storage units, requests to send commit requests to the selected computing device;
- executing, by the set of storage units, the set of rollback requests from the unselected computing device; and
- sending, by the set of storage units, rollback execution notifications to the unselected computing device.

10. A computer readable memory comprises:
a first memory element that stores operational instructions that, when executed by a first computing device of a dispersed storage network (DSN), causes the first computing device to:
- send a first set of write requests to a set of storage units of the DSN, wherein the first set of write requests is regarding a set of encoded data slices;

a second memory element that stores operational instructions that, when executed by a second computing device of the DSN, causes the second computing device to:
- send a second set of write requests to the set of storage units, wherein the second set of write requests is regarding the set of encoded data slices, wherein the second computing device sends the second set of write requests substantially concurrently with the first computing device sending the first set of write requests;

a third memory element that stores operational instructions that, when executed by the first computing device, causes the first computing device to:
- receive favorable write responses from a first subset of storage units of the set of storage units;

a fourth memory element that stores operational instructions that, when executed by the second computing device, causes the second computing device to:
- receive favorable write responses from a second subset of storage units of the set of storage units;

a fifth memory element that stores operational instructions that, when executed by the first computing device, causes the first computing device to:
- determine whether a number of the favorable write responses from the first subset of storage units equals or exceeds a write threshold number; and
- when the number of the favorable write responses from the first subset of storage units equals or exceeds the write threshold number, send a set of commit requests to the set of storage units; and a sixth memory element that stores operational instructions that, when executed by a storage unit of the set of storage units, causes the storage unit to:
- when a storage unit of the set of storage units has a locked write operation for a write request of the first set of write requests and receives a commit request of a set of commit requests from the second computing device prior to receiving a rollback request of a set of rollback requests from the first computing device:
    implement a forced rollback of the locked write operation.

11. The computer readable memory of claim 10, wherein the fifth memory element further stores operational instructions that, when executed by the first computing device, causes the first computing device to:
    when the number of the favorable write responses from the first subset of storage units is less than the write threshold number, send a set of rollback requests to the set of storage units.

12. The computer readable memory of claim 10, wherein a seventh memory element that stores operational instructions that, when executed by the second computing device, causes the second computing device to:
    determine whether a number of the favorable write responses from the second subset of storage units equals or exceeds the write threshold number; and
    when the number of the favorable write responses from the second subset of storage units equals or exceeds the write threshold number, send a set of commit requests to the set of storage units.

13. The computer readable memory of claim 10, wherein a seventh memory element that stores operational instructions that, when executed by the second computing device, causes the second computing device to:
    determine whether a number of the favorable write responses from the second subset of storage units equals or exceeds the write threshold number; and
    when the number of the favorable write responses from the second subset of storage units is less than the write threshold number, send a set of rollback requests to the set of storage units.

14. The computer readable memory of claim 10 further comprises:
    an eighth memory element that stores operational instructions that, when executed by a storage unit of the set of storage units, causes the storage unit to:
        when the storage unit receives a write request of the first set of write requests prior to receiving a write request of the second set of write requests:
        lock a write operation for the write request of the first set of write requests;
        send a favorable response to the first computing device; and
        send an unfavorable response to the second computing device.

15. The computer readable memory of claim 10 wherein the sixth memory element further stores operational instructions that, when executed by the storage unit, causes the storage unit to implement the forced rollback of the locked write operation by:
    unlocking the write operation for the write request of the first set of write requests;
    locking a write operation for a write request of the second set of write requests;
    committing the write operation for the write request of the second set of write requests;
    deleting the write operation for the write request of the first set of write requests; and
    sending a rollback execution notification to the first computing device.

16. The computer readable memory of claim 10 wherein the sixth memory element further stores operational instructions that, when executed by the storage unit, causes the storage unit to implement the forced rollback of the locked write operation by:
    waiting a predetermined amount of time to receive a rollback request of the set of rollback requests from the first computing device; and
    when the rollback request is received from the first computing device within the predetermined amount of time or when the rollback request is not received from the first computing device within the predetermined amount of time:
        unlocking the write operation for the write request of the first set of write requests;
        locking the write operation for the write request of the second set of write requests;
        committing the write operation for the write request of the second set of write requests;
        deleting the write operation for the write request of the first set of write requests; and
        sending a rollback execution notification to the first computing device.

17. The computer readable memory of claim 10 further comprises:
    an eighth memory element that stores operational instructions that, when executed by a storage unit of the set of storage units, causes the storage unit to:
    when a storage unit of the set of storage units has a locked write operation for a write request of the first set of write requests and receives a rollback request of a set of rollback requests from the first computing device prior to receiving a commit request of a set of commit requests from the second computing device:
        wait a predetermined amount of time to receive a commit request of the set of commit requests from the second computing device before executing the rollback request of the set of rollback requests from the first computing device; and
        when the commit request of the set of commit requests from the second computing device is received within the predetermined amount of time or when the commit request of the set of commit requests from the second computing device is not received within the predetermined amount of time:
        execute the rollback request of the set of rollback requests from the first computing device.

18. The computer readable memory of claim 10 further comprises:
    a ninth memory element that stores operational instructions that, when executed by the set of storage units, causes the set of storage units to:
        receive a set of rollback requests from the first computing device and a set of rollback requests from the second computing device;
        select one of the first computing device and the second computing device as a selected computing device based on a contention resolution policy;
        unlock write operations locked by the unselected computing device;
        lock at least a write threshold number of write operations for the selected computing device;
        send requests to send commit requests to the selected computing device;
        execute the set of rollback requests from the unselected computing device; and
        send rollback execution notifications to the unselected computing device.

\* \* \* \* \*